US009656167B2

(12) United States Patent
Morel et al.

(10) Patent No.: US 9,656,167 B2
(45) Date of Patent: May 23, 2017

(54) PRE-PLAY AND POST-PLAY VIDEO GAME CHARACTER PRESENTATION AND EQUIPPING

(71) Applicant: Activision Publishing, Inc., Santa Monica, CA (US)

(72) Inventors: Jean-Marc Morel, Santa Monica, CA (US); Evan Webb, Santa Monica, CA (US); Christopher Reed, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 13/841,952

(22) Filed: Mar. 15, 2013

(65) Prior Publication Data

US 2014/0274377 A1    Sep. 18, 2014

(51) Int. Cl.
*A63F 13/00* (2014.01)
*A63F 13/48* (2014.01)
*A63F 13/49* (2014.01)

(52) U.S. Cl.
CPC .............. *A63F 13/48* (2014.09); *A63F 13/49* (2014.09); *A63F 2300/5553* (2013.01)

(58) Field of Classification Search
CPC .......... A63F 13/12; A63F 13/60; A63F 13/47; A63F 2300/57
USPC ................................... 463/1, 31, 42; 345/467
See application file for complete search history.

(56) References Cited

U.S. PATENT DOCUMENTS

| | | | | |
|---|---|---|---|---|
| 5,720,663 | A * | 2/1998 | Nakatani ............... | A63F 13/005 463/23 |
| 6,428,414 | B1 * | 8/2002 | Shimomura et al. .......... | 463/31 |
| 7,300,345 | B2 * | 11/2007 | Mifune et al. .................... | 463/4 |
| 2002/0049087 | A1 * | 4/2002 | Ushiro et al. .................. | 463/42 |
| 2003/0083128 | A1 * | 5/2003 | Mifune et al. ................. | 463/31 |
| 2007/0167204 | A1 * | 7/2007 | Lyle et al. ........................ | 463/9 |
| 2008/0004093 | A1 * | 1/2008 | Van Luchene et al. .......... | 463/1 |
| 2008/0306951 | A1 * | 12/2008 | Rodefer ............................ | 707/9 |
| 2010/0045697 | A1 * | 2/2010 | Reville ................... | A63F 13/12 345/619 |

(Continued)

OTHER PUBLICATIONS

Wikipedia, "Tiger Woods PGA Tour 2007", retrieved from Internet on Jun. 15, 2014, Originally published Nov. 19, 2011 according to Internet Archive, <http://en.wikipedia.org/wiki/Tiger_Woods_PGA_Tour_07>.*

(Continued)

*Primary Examiner* — Jay Liddle
*Assistant Examiner* — Ryan Hsu
(74) *Attorney, Agent, or Firm* — Klein, O'Neill & Singh, LLP

(57) ABSTRACT

Systems and methods for pre-game and post-game video game character presentation and equipping are disclosed. According to one aspect of the invention, a computer implemented method useful for video game play comprises: determining identities and equipment of at least some game characters for participation in game play; in a time period outside of game play, providing information for rendering the game characters with their equipment in a scene having visual characteristics of a virtual world for game play; providing game players the opportunity to change and/or purchase equipment for their game characters; and providing for game play including the game characters.

2 Claims, 9 Drawing Sheets

(56) References Cited

U.S. PATENT DOCUMENTS

2010/0234106 A1* 9/2010 Kojima et al. ............... 463/31
2013/0331180 A1* 12/2013 Heller et al. ............... 463/29

OTHER PUBLICATIONS

Miller, Jonathan, "Tiger Woods PGA Tour 07 Review: Next-gen golf has a bright future", IGN, Oct. 13, 2006, retrieved from Internet on Jun. 15, 2014 from <http://www.ign.com/articles/2006/10/14/tiger-woods-pga-tour-07-review-4>.*
ChickenConPolloHD, How to Select Alternate Color/Alternate Costumes Mortal Kombat 9, Apr. 25, 2011, retrieved from YouTube on Apr. 15, 2015 at Internet URL <https://www.youtube.com/watch?v=9Z1-3qDAv68>.*
Thomas, Aaron, "Tiger Woods PGA Tour 07 Review", Oct. 17, 2006, retrieved from Internet via gamespot on Apr. 17, 2015 at Internet URL <http://www.gamespot.com/reviews/tiger-woods-pga-tour-07-review/1900-6159964/>.*
Gamesradar, "Tiger Woods PGA Tour 07", retrieved from Internet via gamesradar on Apr. 17, 2015 at Internet URL <http://www.gamesradar.com/tiger-woods-pga-tour-07/screenshots/>.*
Oxford Dictionary, "gameplay", retrieved from Internet via Oxford Dictionaries Language matters from Internet URL <http://www.oxforddictionaries.com/us/definition/american_english/gameplay>.*
PlayingWithHistory, "Tiger Woods PGA Tour 07 PS2 Gameplay", YouTube, Feb. 22, 2011, retrieved from Internet on Apr. 20, 2015 from URL <https://www.youtube.com/watch?v=jKbgW35hqfY>.*
Glitchologteam, Tiger Woods PGA Tour 07 Playstation 2 Gameplay (EA Sports 2006) (HD) via Youtube, retrieved from Internet at URL<https://www.youtube.com/watch?v=GqWwwmt8ECo>.*
"Superguide Tiger Woods PGA Tour 2007", Feb. 8, 2007, MyCheats, p. 1-8, retrieved from Internet at URL<http://mycheats.1up.com/view/superguide/3150525/tiger_woods_pga_tour_2007/ps3>.*
ChickenConPolloHD, "How to Select Alternate Color/Alternate Costumes Mortal Kombat 9", Apr. 25, 2011, retrieved from YouTube on Apr. 15, 2015 at Internet URL<https://www.youtube.com/watch?v=9Z1-3qDAv68>.*
AntoDaBoss, "How to unlock 5 Pro Combat Uniforms—NCAA Football 2012", Sep. 14, 2011, YouTube, retrieved from URL <https://www.youtube.com/watch?v=ZmnopgJYICk>.*
xXGuitarPickXx—"2 player team on NCAA 12 with my buddy", Oct. 23, 2011, YouTube, retrieved from URL <https://www.youtube.com/watch?v=0yt8jLvX8yk>.*

* cited by examiner

PRE-PLAY AND POST-PLAY VIDEO GAME CHARACTER PRESENTATION AND EQUIPPING

BACKGROUND OF THE INVENTION

The present invention relates generally to multi-player video games, and more particularly to out-of-game play presentations supporting equipping of video game characters.

Video games are enjoyed by many, often allowing video game players to virtually participate in otherwise unavailable activities, whether due to requirements of skill, experience, or equipment availability, or simply due to inherent dangers of the activities.

In many games a video game player may control a video game character, who may have various skills and powers, and who may be equipped with various items, whether for use in the video game or merely for purposes of visual appearance in a virtual world of the game. Some games may allow for personalization of equipping of video game characters. The personalization, which may be termed equipping, may relate to clothing worn by a video game character, whether for function or fashion, and what may be broadly termed accessories. The accessories may be tools or other useable equipment carried by the video game character for the video game character's use. The personalization may also, in some embodiments, relate to the video game character's skills or capabilities, capabilities which include an ability to call upon assistance provided by capabilities of others.

In some video games some personalizations may be more desirable than others. For example, some personalizations may be appropriate for some virtual worlds, but not others. Similarly, in the context of multi-player games, some personalizations may be more desirable over others depending on the personalizations of opponents or teammates.

Unfortunately, a desired personalization of a video game character may not be known until game play commences, and depending on the nature of game play, changes in personalization during game play may not be possible, or if possible not prudent if success during game play is desired.

Traditionally, video games were generally monetized through sales of the games themselves, either as a packaged item or through an online download. These transactions were typically one-time transactions between a buyer and a seller (e.g., retailer, video game publisher, or video game developer). More recently, new monetization models have developed. For example, instead of, or in addition to, the traditional sale of the video game itself, some sellers are now monetizing video games through multiple, small, in-game transactions called microtransactions or micropayments. In some cases, users of video games may obtain the personalizations described above through such microtransactions, for free, or through some combination of microtransactions and free transactions. One challenge facing video game sellers who use microtransactions is to find effective and non-intrusive ways to further incentivize users to purchase microtransactions.

BRIEF SUMMARY OF THE INVENTION

One aspect of the invention provides a computer implemented method useful for video game play, comprising: determining identities and equipment of at least some game characters for participation in game play; in a time period outside of game play, providing information for rendering the game characters with their equipment in a scene having visual characteristics of a virtual world for game play; and providing for game play including the game characters.

Another aspect of the invention provides a system for providing for changes to equipment of a game character prior to play of a video game, comprising: a plurality of compute devices coupled by a network to a server, the compute devices and server configured to: prior to commencement of game play including game characters assigned to teams, provide for display of a team of game characters with their equipment in a scene having visual characteristics of a virtual world for game play; provide an option for change of equipment of the team of game characters, the option accessible during display of the team of game characters with their equipment in the scene having visual characteristics of a virtual world for game play prior to commencement of game play; provide for further display of the team of game characters with their equipment, as changed, in the scene having visual characteristics of a virtual world for game play prior to commencement of game play; and provide for game play.

Another aspect of the invention provides a system for recommending equipment suitable for a game character prior to play of a video game, comprising: a plurality of compute devices coupled by a network to a server, the compute devices and server configured to: prior to commencement of game play including game characters, provide for display of the game characters with their equipment in a scene having visual characteristics of a virtual world for game play; provide a recommendation for one or more pieces of equipment suitable for a game character, said recommendation being based on the characteristics of the virtual world for game play; provide an option for purchase of at least one of the recommended pieces of equipment, the option accessible during display of the game characters with their equipment in the scene having visual characteristics of a virtual world for game play prior to commencement of game play; and provide for game play.

Another aspect of the invention provides a computer implemented method for purchasing items in a video game, comprising: determining identities and equipment of at least some game characters for participation in game play: in a time period outside of game play, providing information for rendering the game characters with their equipment in a scene having visual characteristics of a virtual world for game play; upon request, providing a description of the equipment of at least one of the game characters: allowing a user to purchase the described equipment; and providing for game play including the game characters.

These and other aspects of the invention are more fully comprehended upon review of this disclosure.

DETAILED DESCRIPTION

Figure 1:
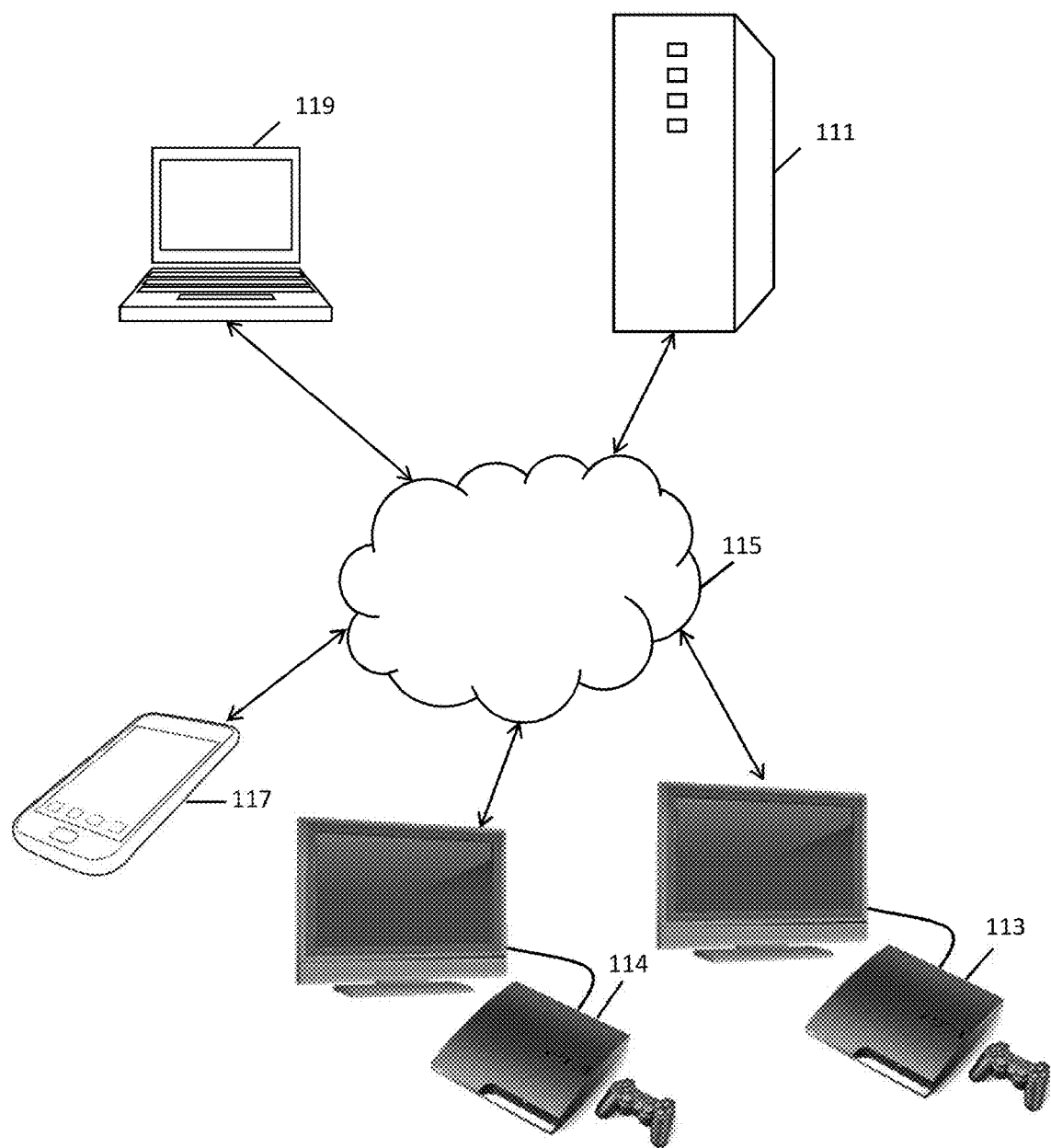
FIG. 1 is a block diagram of a system in accordance with aspects of the invention.

FIG. 1 illustrates a system in accordance with aspects of the invention. A first game console 113 and a second game console 114, each with associated monitor and game controller, are each configured for play of a video game. Although only two game consoles are explicitly shown in FIG. 1, in many embodiments the system of FIG. 1 includes many game consoles. The game console may be any suitable compute device (e.g., Xbox, PlayStation, Wii, personal computers, laptops, tablets, smartphones, etc.). The game consoles are coupled to a network 115. The network may be a broad area network, for example the Internet.

In addition to the game consoles, compute devices (which have for example at least one processor and memory), such as a smartphone 117, and a personal computer, shown in the form a laptop computer 119 may also be coupled to the network. In some embodiments, some or all of these other compute devices each may be configured for play of the video game. The smartphone is generally coupled to the Internet by way of a wireless cellular communications system, which may include wired communications links in addition to wireless communication channels. The server, laptop, and smartphone, of course, each have one or more processors, memory, communication circuitry, and associated hardware.

Also coupled to the network is a server 111. The server may be for example be part of a server farm, including multiple servers, some of which may provide similar functions, and the server farm may be located at a co-location facility or other facility providing security, environmental conditioning, and wired Internet connections. The server may be for example be part of a server farm, including multiple servers, some of which may provide similar functions, and the server farm may be located at a co-location facility or other facility providing security, environmental conditioning, and wired Internet connections.

During game play the compute devices, which include at least one processor, computer memory, communication circuitry, and associated other hardware, execute program instructions to provide for play of the video game, generally in conjunction with the server. Video game players provide game play inputs using their respective input devices, for example game controllers, and the associated monitors display game play events. In various embodiments the video game may be an action game, for example a fighting game or a first-person shooter game, a role playing game, or a vehicle simulator game.

The server, in addition to possibly other functions, performs functions related to video game play amongst users of the compute devices. In some embodiments the server may distribute game state and/or action information received from the compute devices to allow for coordinated game play amongst multiple game players, and in some embodiments the server may also determine game states based on information received from the compute devices regarding actions taken during game play. In some embodiments, one or more compute devices may act as the server, thus allowing users of the compute devices to host multiplayer games.

In various embodiments, prior to and/or after game play, the system of FIG. 1 provides information regarding game characters and a virtual world in which the game occurs or is to occur by way of rendered images including the game players and a scene of, or representative of, the virtual world. The rendered images, in many embodiments, include the game characters in the scene of the virtual world, equipped and ready to play the game, or as equipped at the end of the game. In some embodiments the rendered images may be still images, or a sequence of images providing a video presentation of game characters moving about the scene, or assuming various poses in the scene.

In many embodiments the rendered images are displayed in conjunction with an option to change equipment of, or purchase equipment for, a game character. For example, a game player may realize the equipment could be improved considering the nature of the virtual world or the equipment of the other game characters, who may be teammates during game play. For example, the game character could be dressed in clothing that stands out in the virtual world, when camouflage is desired. Similarly, the game character could be dressed differently than the other teammates when similarity of dress is desired, or vice versa. In addition, a game player may realize that the combination of equipment of the teammates is lacking, or that another game player has particular equipment also desired. As another example, a game player observe the equipment or accessories of one or more other game players and desire to acquire one or more of the observed items.

In some embodiments, a game player can only view game characters, and their equipment, or load out, on their team. In another embodiment each game player can see the equipment loadout of game players from all teams. In this embodiment game player's equipment choices can be influenced by the choices made by the opposing team. Such information regarding the other team's equipment loadout adds a strategic element before game play begins. It also provides the game player an additional opportunity to purchase and use new equipment before game play begins.

Accordingly, selection of the option to purchase and/or change equipment allows a game player to modify equipment selections for the game player's game character. In some embodiments, selection of the option causes the system to present displays relating to and allowing for purchase of equipment or for change of equipment selection, with the system causing return to display of the rendered images after equipment purchase and/or selection is completed.

In some embodiments the rendered images are also displayed in conjunction with message boxes showing communications between game players.

Figure 2:
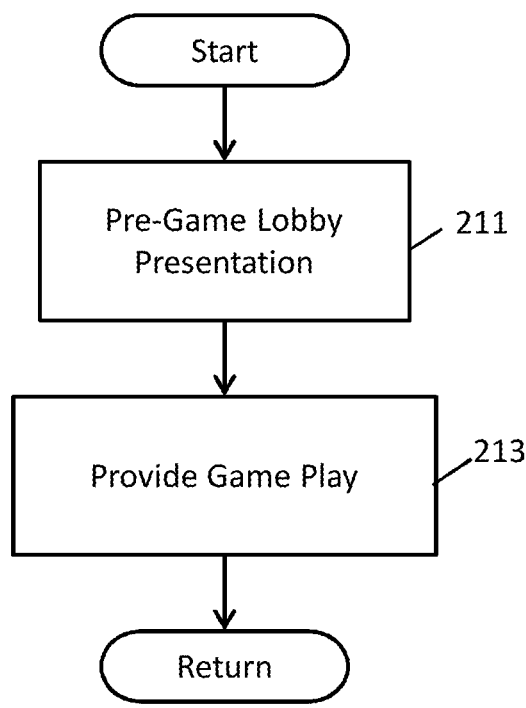
FIG. 2 is a flow chart of a process in accordance with aspects of the invention.

FIG. 2 is a flow chart of a process in accordance with aspects of the invention. The process may be perforated by the system of FIG. 1, or portions of the system of FIG. 1.

In block 211, the process provides pre-game play presentation information for display of video game characters, equipped for game play, in a scene having visual characteristics of a virtual world in which game play is to take place. The scene may be termed a lobby. The lobby may provide an opportunity for game players, who may be physically remote from one another, to interact, for example by way of text communications. In one embodiment, a background of the lobby is scenery of the virtual world in which game play will take place. In another embodiment, the background has visual characteristics of a generic facility suitable considering the nature of the game play, for example a generic military equipment storage facility, in the case of a warfare video game. In one embodiment the lobby includes chatroom functionality for game player to game player communication. In some embodiments, the process provides for game players to make changes to the equipment of the video game characters, for example tools, possibly including weapons, clothing, and other items to be carried, used, or called upon by or for the video game characters. For example, more equipment may be available than game play allows a game character to employ, with selection of particular equipment to be used made by the game player. Accordingly, individual game players may switch equipment for a game character prior to game play. In some embodiments, the process allows for game players to obtain a description of the equipment and items used by one or more other players. The description may, in some embodiments, include the purchase price of the items. In some embodiments, the process allows the game player to purchase additional equipment, including the equipment described for the one or more other players. In some embodiments, the process enables one or more of the chatroom functionality, equipment change functionality, and purchase functionality. In addition, for a given game player, the process may make only a subset of other game players viewable in the lobby (e.g., only the given game player's teammates).

In some embodiments, the operations of block 211 are performed by a server, and the presentation information comprises rendered images. In some embodiments, the operations of block 211 are performed by a compute device configured for game play, and the presentation information comprises rendered images. In many, perhaps most embodiments, the operations of block 211 are performed by a combination of a server and a compute device configured for game play, with the server providing information for a compute device configured for game play to use, in conjunction with information possessed by the compute device, to render images comprising the presentation information.

In block 213, the process provides for game play. During game play the compute devices and/or server determine game states based on user inputs to the compute device in accordance with program instructions providing for game play, and determine game play presentations based on the game states, also in accordance with program instructions. In some embodiments, game play may be time based, with game play ending after a designated amount of time has passed, and in some embodiments game play may be event based, with game play ending after occurrence of one or more specific events takes place in game play.

As illustrated in FIG. 2, the process thereafter returns. In some embodiments, however, the process may return to block 211 upon completion of game play, for example to provide for additional interaction involving the game players or to allow the game players to consider or make further equipment changes for the future, while being able to view the equipment of the other game characters.

Figure 3:
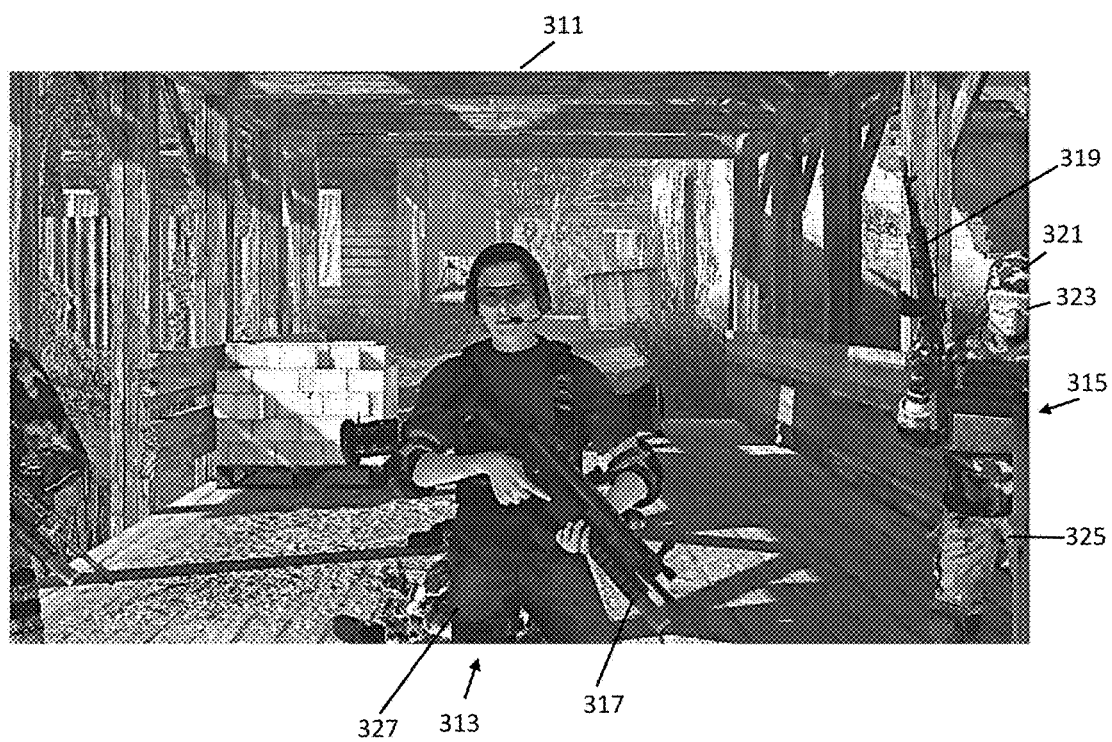
FIG. 3 is a screen shot of a portion of a lobby in accordance with aspects of the invention.

FIG. 3 is a screen shot of a portion of a lobby in accordance with aspects of the invention. The screen shot of FIG. 3 shows a background scene 311 having visual characteristics of a virtual world in which game play is to take place. In some embodiments, the screen shot may be one of the images of a lobby presented as discussed with respect to the process of FIG. 2.

As shown in FIG. 3, the scene may be considered to include an interior of a partially enclosed structure in a semi-rural mid-latitude environment. A plurality of game characters, equipped for game play, are shown in the screen shot. For example, a first game character 313 is shown, along with substantial portions of a second game character 315. The first game character is shown wearing dark pants 327 and holding an assault weapon with launcher tube 317. The second game character is shown wearing lighter colored pants 325, a camouflage headwrap 321, and a light bandana 323 over the character's face and holding an assault rifle 319. The background, the characters, and the equipment are a rendered image in the screen shot of FIG. 3. In most embodiments, the scene is dynamic, in that the characters may move, and in some embodiments portions of the background as well, and the image of the screenshot is of a stream of images providing a video presentation.

A game player, for example a game player who controls or is to control the first game character, may decide upon viewing the scene that the game player's character has deficient equipment in some manner. For example, the game characters may be part of a team of game players, and it may be desired that all the team members have a common item of clothing, for example a bandana such as the bandana of the second game character. Alternatively or in addition, the first game player may consider that the combination of weapons carried by the team members is lacking, and that the first game character should be equipped with some other weapon.

Figure 4:
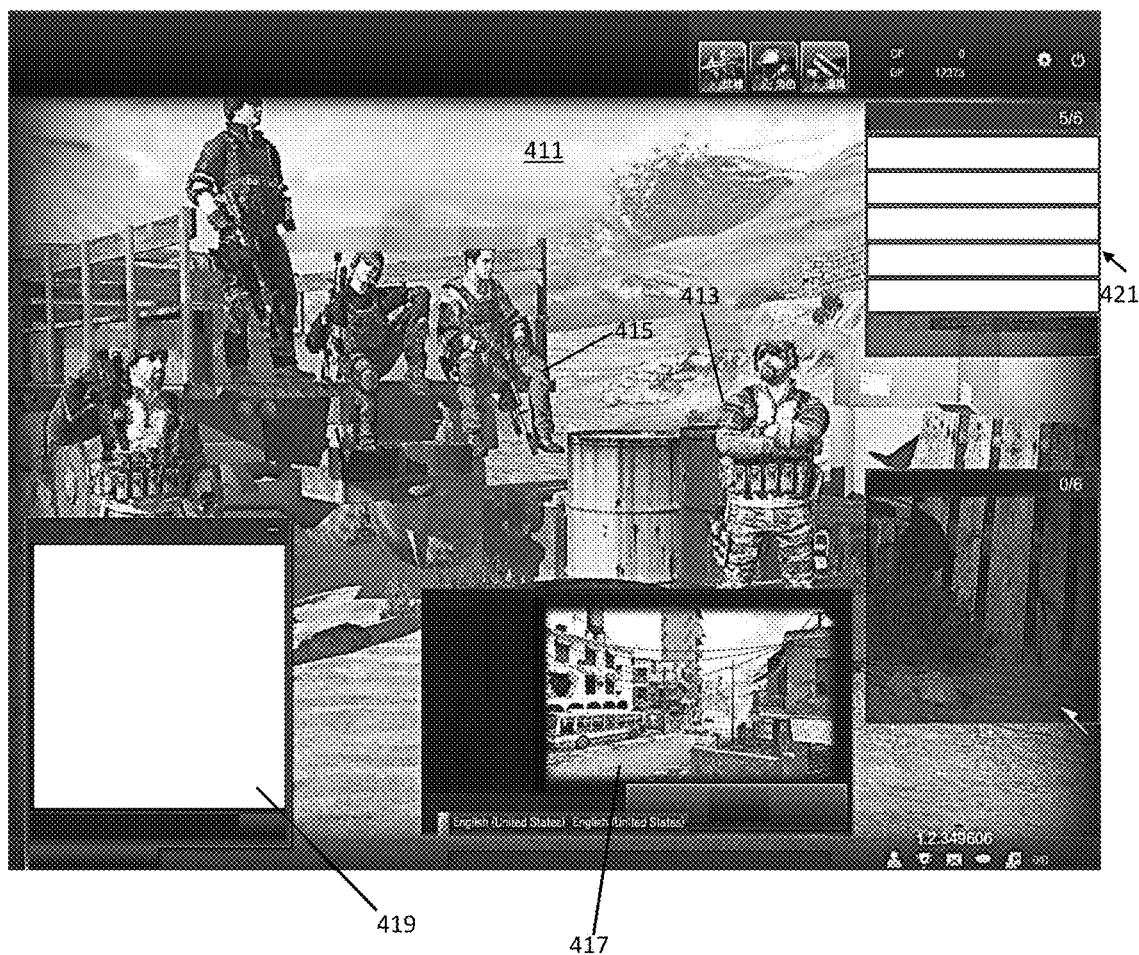
FIG. 4 is a screen shot including a lobby in accordance with aspects of the invention.

FIG. 4 is a screen shot including a lobby in accordance with aspects of the invention. The screen shot of FIG. 4 includes a background scene 411 having visual characteristics of a virtual world in which game play is to take place. In some embodiments the screen shot include one of the images of a lobby presented as discussed with respect to the process of FIG. 2.

As shown in FIG. 4, a plurality of game characters are present in the scene, for example game characters 413 and 415. In some embodiments, only a subset of game characters are shown to a given game player (e.g., the given game player's teammates, or the given player's friends or clan members). The scene itself is bounded by a border, which may include selectable options relating to a video game. Inset within the scene is a message box 419, for display of messages between game players who control or are to control the game characters. Also inset is an image of a particular location 417 within the virtual world, which may have some importance to game play in some embodiments. Also inset are selectable options 421 for performing equipment changes to, or purchasing equipment for, a game character. In some embodiments, selection of such a selectable option results in display of a different screen allowing for equipment changes and/or purchases. In some embodiments, selection of such a selectable option may result in an immediate change in equipment selection for a game character, with the game character then shown in the scene with the changed equipment. In some embodiments selection of such a selectable option results in display of screens allowing for purchase of an option to expand equipment available for selection. In some embodiments the selectable options, or a selectable option, for performing equipment changes, which may involve other presentation screens, may be otherwise provided. For example, a link available on the display may instead be available, and the selectable options 421 may instead be a list 421 of team members, or opposing team members, or both. In such embodiments, the process may provide for display of further information regarding a particular team member, for example if a game player scrolls or points to a particular team member using an input device of a compute device. The further information may be, for example, a listing of equipment of that team member. In addition, in some embodiments a selectable option allowing a game player to switch to an opposing team may be provided.

Figure 5:
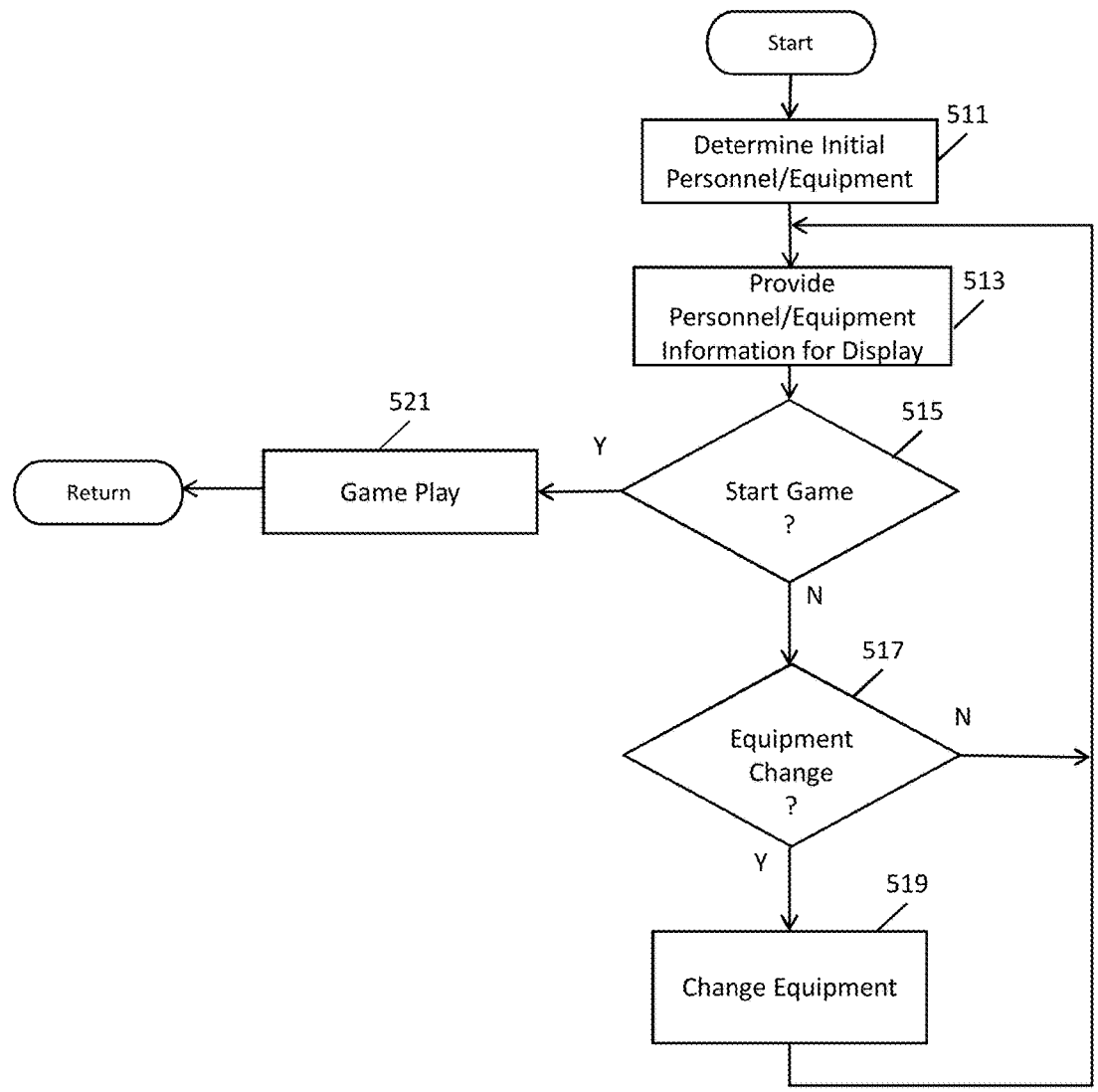
FIG. 5 is a flow chart of a process including a pre-game equipment change option in accordance with aspects of the invention.

FIG. 5 is a flow chart of a process including a pre-game equipment change option in accordance with aspects of the invention in accordance with aspects of the invention. The process may be performed by the system of FIG. 1, or portions of the system of FIG. 1.

In block 511, the process determines initial personnel and equipment for play in a video game. Personnel are game characters, for example avatars in some embodiments, generally controlled by game players. The game characters may be assigned to a team, and may be assigned to a team for a particular online game play session. Equipment includes, in various embodiments, in-game weapons, associated tactical gear, clothing worn by, or available to, the avatar, or some or all of the foregoing, during game play.

In block 513, the process provides display information for images or for use in generating images showing game characters with their equipment in a background scene of or having characteristics of the virtual world in which game play will take place. In one embodiment, equipment is displayed as graphical recreation of the piece of equipment, either held by the game character, about the game character, or placed on the game character's person. In a further embodiment, the equipment is displayed partly as a graphical recreation and partly as text on the screen. In some embodiments, the display information is the display information for the screen shots of FIGS. 3 and/or 4, or display information for images similar in nature to those screen shots. In some embodiments, the process provides a description of one or more game character's equipment. In some embodiments, the description includes a purchase price for the one or more items. In some embodiments, the process only displays to a given game player a subset of other game players (e.g., the given game player's teammates, friends, or clan members).

In block 515, the process determines if game play should begin. In some embodiments game play begins at a predefined time. In some embodiments game play begins when some or all game players provide an indication, using their compute devices for example, that game play should begin. If game play should begin, the process continues to block 521, which provides for game play for the course of the game, and then returns. Otherwise the process continues to block 517.

Often, a game character's profile will include more equipment than game play allows the game character to employ. Based on the game play scenario, the mix of equipment the game players have equipped, or loaded out, for their game characters could be considered by the game players to be less than ideal. Similarly, a game player may observe another game player's load out and decide that the other player's load out is advantageous to the game player scenario. In such instances, or other instances, individual game players may switch and/or purchase equipment so that the equipment may be utilized during gameplay. Accordingly, in block 517, the process determines if a game player has requested an equipment change and/or purchase for the game player's game character. In some embodiments, the process determines if a game player has requested an equipment change and/or purchase if the process receives an indication that a compute device of a game player has received an input requesting an equipment change and/or purchase.

In block 519, the process changes equipment and/or transacts a purchase for a game character. In some embodiments the process changes and/or transacts a purchase for equipment for the game character based on menu selections, determined by a compute device based on game player inputs. In one embodiment, available equipment is displayed graphically, and equipment changes effected by receipt of compute device inputs, controlled by the game player, resulting in movement of equipment from an unused state to an in use state. In another embodiment, the equipment available is displayed and selectable in a check box type fashion. In another embodiment, the process allows for the purchase of another game player's entire loadout in one transaction. Once the equipment change or purchase has been made, the process returns to block 513 and displays the lobby and game characters with their then current equipment.

Figure 6:
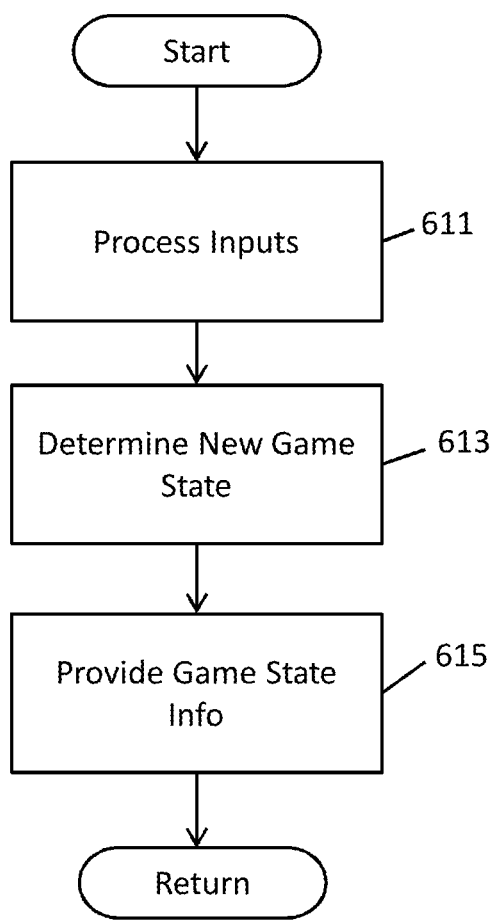
FIG. 6 is a flow chart of a process for providing game play in accordance with aspects of the invention.

FIG. 6 is a flow chart of a process for providing video game play in accordance with aspects of the invention. The process may be performed by the system of FIG. 1, or portions thereof, in various embodiments.

In block 611 the process processes compute device inputs. The compute device inputs are generally controlled by game players operating input devices of or associated with the compute devices.

In block 613 the process determines a new game state. In most embodiments the process determines a new game state based on the compute device inputs, in accordance with programming instructions of the video game. Generally the game state includes information regarding game character position and posture within a virtual game world, and may include bone information of the game character, an action being taken by the game character, a result of an action taken by other game characters, and other game information.

In block 615 the process provides the game state information, or portions of the game state information, for display purposes, for example for generation of displays on display elements of or associated with compute devices of game players.

The process thereafter returns, generally to repeat until a conclusion of game play.

Figure 7:
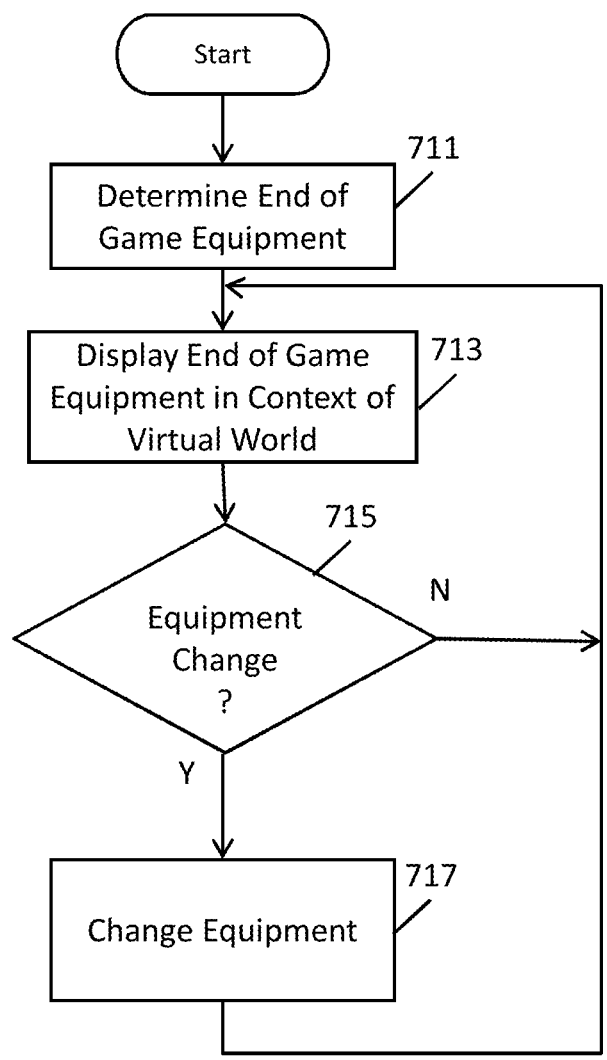
FIG. 7 is a flow chart of a process including a post-game equipment change option in accordance with aspects of the invention.

FIG. 7 is a flow chart of a process including a post-game equipment change option in accordance with aspects of the invention. The process may be performed by the system of FIG. 1, or portions thereof in various embodiments.

In block 711, the process determines game players' end of game equipment in a video game. Equipment includes, in various embodiments, in-game weapons, associated tactical gear, clothing worn by, or available to, the game character, or some or all of the foregoing.

In block 713, the process, in a manner similar to that of block 513 of the process of FIG. 5, provides display information for images or for use in generating images showing game characters with their equipment in a background scene of or having characteristics of the virtual world in which game play will take place. The display information can be considered display information for a lobby including the game characters. In one embodiment equipment is displayed as graphical recreation of the piece of equipment, either held by the game character, about the game character, or placed on the game character's person. In a further embodiment, the equipment is displayed partly as a graphical recreation and partly as text on the screen. In some embodiments the display information is the display information for the screen shots of FIGS. 3 and/or 4, or display information for images similar in nature to those screen shots. In some embodiments, only a subset of game players are displayed. For example, only the top performers of the game are displayed. As another example, the top performers of the game may be displayed alongside the worst performers of the game, with the top performers assuming victorious poses while the worst performers assume dejected poses. As another example, only the winning team may be displayed. Of course, these examples are merely illustrative, and any combination of players may be displayed.

In block 715, the process determines if a game player has requested an equipment change and/or purchase for the game player's game character. In some embodiments, the process determines if a game player has requested an equipment change and/or purchase if the process receives an indication that a compute device of a game player has received an input requesting an equipment change and/or purchase.

In block 717, the process changes and/or transacts a purchase of equipment for a game character. In some embodiments the process changes and/or transacts a purchase of equipment for the game character based on menu selections, determined by a compute device based on game player inputs. In one embodiment, available equipment is displayed graphically, and equipment changes and/or purchases effected by receipt of compute device inputs, controlled by the game player, resulting in movement of equipment from an unused state to an in-use state. In another embodiment, the equipment available is displayed and selectable in a check box type fashion. Once the equipment change and/or purchase has been made, the process returns to block 713 and displays the lobby and game characters with their then current equipment.

Figure 8:
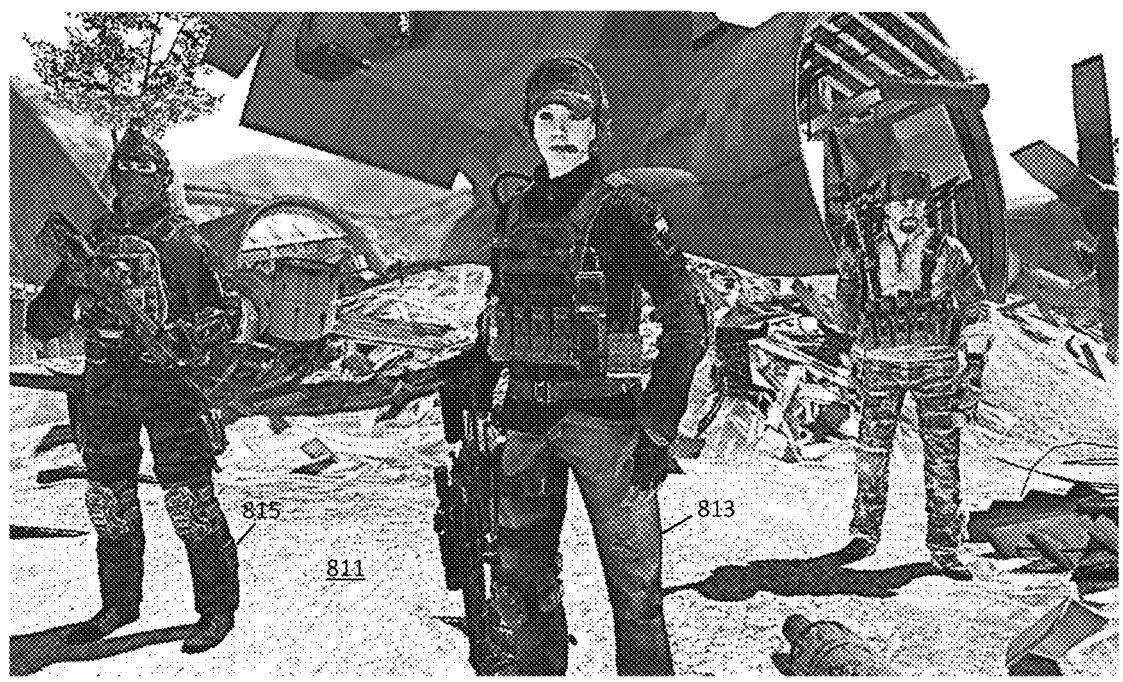
FIG. 8 is a further screen shot including a lobby in accordance with aspects of the invention.

FIG. 8 shows a portion of screen shot of a post-game lobby in accordance with aspects of the invention. In various embodiments, the post-game lobby may as be discussed with respect to the pre-game lobbies of FIGS. 3 and 4. The lobby of FIG. 8 shows game characters, with their equipment, in a scene of or having characteristics of the virtual world of the preceding game play.

Figure 9:
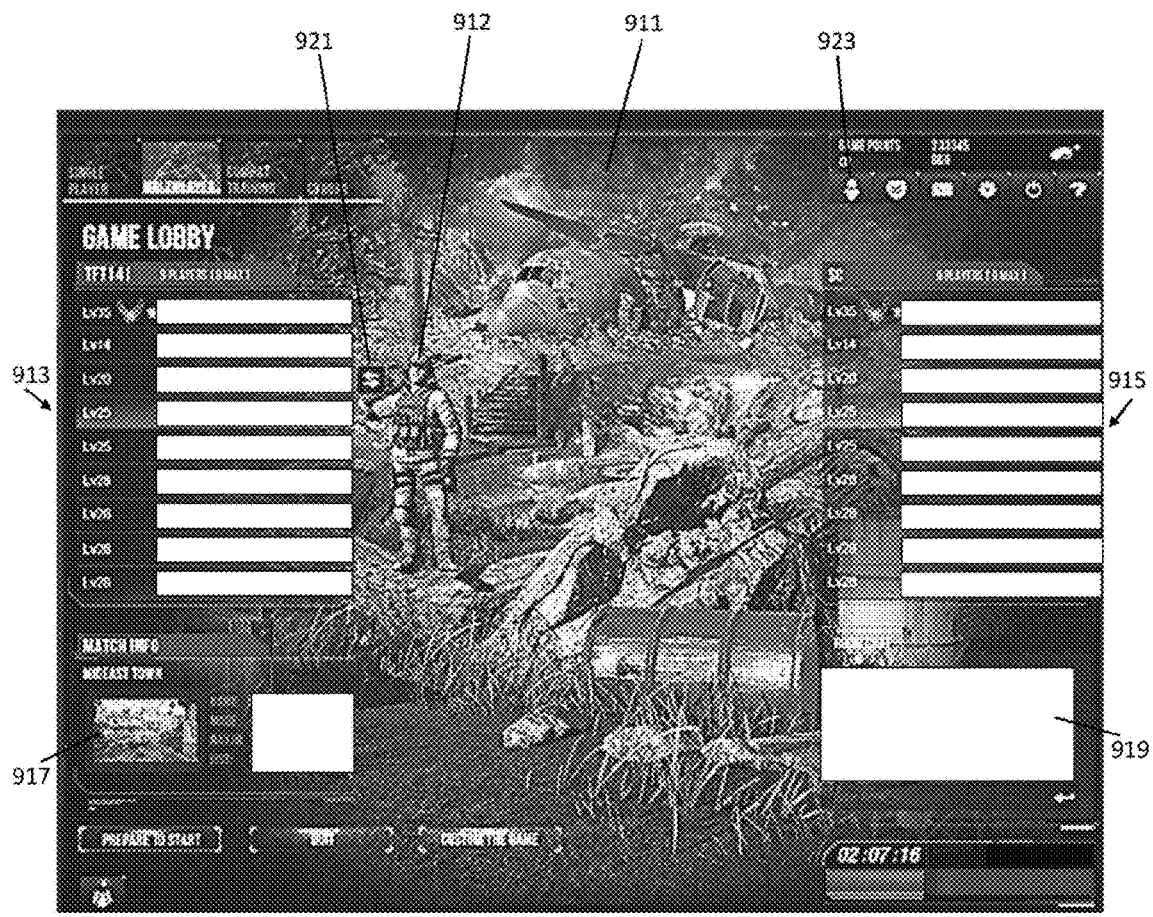
FIG. 9 is a further screen shot including a lobby in accordance with aspects of the invention.

FIG. 9 shows a further screen shot in accordance with aspects of the invention. In some embodiments the screen shot may include or represent a lobby as discussed herein. The screen shot of FIG. 9 includes a background scene having visual characteristics of a virtual world in which game play is to or has taken place. A game character 912 is shown in the context of the background.

The screen shot includes a team member listing 913 and an opposing team member listing 915. In some embodiments additional information regarding a particular team member or opposing team member may be displayed if a game player points to or selects one of such teammates, for example using an input device of a compute device. The additional information may be, for example, equipment of that team member or opposing team member. In addition to show a listing of members of the teams, the screen shot also shows a selectable option 921 allowing a game character of the game player to switch teams.

As with the screenshot of FIG. 4, the screenshot of FIG. 9 also shows an image of a scene from the virtual world of game play, which may be a scene that may have game importance in during game play, as well as a message box 919 for displaying messages between game players.

Although the invention has been discussed with respect to various embodiments, it should be recognized that the invention comprises the novel and non-obvious claims supported by this disclosure.

What is claimed is:

1. A system for providing for changes to equipment of a game character prior to play of a video game, comprising:
a plurality of compute devices coupled by a network to a server, the compute devices and server configured to:
prior to commencement of game play including game characters assigned to teams, provide for display of a team of game characters with their equipment in a scene having visual characteristics of a virtual world for game play;
prior to commencement of game play, provide a recommendation for one or more pieces of equipment suitable for a game character, the recommendation being based on the visual characteristics of the virtual world for game play;
provide an option for change of equipment of the team of game characters, the option accessible during display of the team of game characters with their equipment in the scene having visual characteristics of a virtual world for game play prior to commencement of game play;
provide for further display of the team of game characters with their equipment, as changed, in the scene having visual characteristics of a virtual world for game play prior to commencement of game play; and
provide for game play.

2. The system of claim 1, wherein the scene having visual characteristics of the virtual world for game play is a scene of the virtual world for game play.

* * * * *